US009392432B2

(12) United States Patent
Karaman et al.

(10) Patent No.: US 9,392,432 B2
(45) Date of Patent: Jul. 12, 2016

(54) INTERFACE BETWEEN BASE STATIONS FOR TOPOLOGY DISCOVERY TO ENABLE COORDINATED RESOURCE USAGE

(71) Applicant: ARGELA YAZILIM VE BILISIM TEKNOLOJILERI SAN. VE TIC. A.S., Istanbul (TR)

(72) Inventors: Melih Ahmet Karaman, Istanbul (TR); Mustafa Ergen, Istanbul (TR); Seyhan Civanlar, Istanbul (TR); Nazli Guney, Istanbul (TR)

(73) Assignee: ARGELA YAZILIM VE BILISIM TEKNOLOJILERI SAN. VE TIC. A.S., Istanbul (TR)

( * ) Notice: Subject to any disclaimer, the term of this patent is extended or adjusted under 35 U.S.C. 154(b) by 84 days.

(21) Appl. No.: 14/108,756

(22) Filed: Dec. 17, 2013

(65) Prior Publication Data

US 2015/0173086 A1 Jun. 18, 2015

(51) Int. Cl.
*H04W 16/10* (2009.01)
*H04W 8/00* (2009.01)
*H04W 84/22* (2009.01)

(52) U.S. Cl.
CPC .............. *H04W 8/005* (2013.01); *H04W 16/10* (2013.01); *H04W 84/22* (2013.01)

(58) Field of Classification Search
None
See application file for complete search history.

(56) References Cited

U.S. PATENT DOCUMENTS

| 7,522,540 | B1* | 4/2009 | Maufer | 370/254 |
|---|---|---|---|---|
| 8,838,127 | B2* | 9/2014 | Chen et al. | 455/450 |
| 2008/0268858 | A1* | 10/2008 | Wu et al. | 455/448 |
| 2009/0059846 | A1* | 3/2009 | Burgess et al. | 370/328 |
| 2009/0081955 | A1 | 3/2009 | Necker | |
| 2011/0249642 | A1* | 10/2011 | Song et al. | 370/329 |
| 2012/0021753 | A1* | 1/2012 | Damnjanovic et al. | 455/450 |
| 2012/0122503 | A1* | 5/2012 | Ma et al. | 455/501 |
| 2014/0112291 | A1* | 4/2014 | Hahn et al. | 370/329 |

FOREIGN PATENT DOCUMENTS

WO 2013079913 6/2013

* cited by examiner

*Primary Examiner* — Robert C Scheibel
(74) *Attorney, Agent, or Firm* — IP Authority, LLC; Ramraj Soundararajan

(57) ABSTRACT

A description of an interface and a system/method is provided to combine frequency, time and power domain resource partitioning between neighbor small cells whereby these cells can execute the resource partitioning, without resorting to a centralized management system, simply by periodically sharing topology-related and interference related information with one another. Such a scheme allows resource partitioning to be executed in real-time as more small cells are deployed into the network.

19 Claims, 10 Drawing Sheets

INTERFACE BETWEEN BASE STATIONS FOR TOPOLOGY DISCOVERY TO ENABLE COORDINATED RESOURCE USAGE

BACKGROUND OF THE INVENTION

1. Field of Invention

The disclosed invention generally relates to the field of cellular wireless communications networks. In particular, it relates to mini base stations also known as small cells, where an interface is defined between base stations to dynamically exchange neighbor topology information, which helps reduce inter-cell interference in real-time, especially for areas of large small cell deployments.

2. Discussion of Related Art

It is possible to improve network coverage and performance by overlaying low-power and low-cost small cells over existing cellular networks composed of macrocells to turn them into "heterogeneous" networks. Likewise, the $3^{rd}$ Generation Partnership Program (3GPP) defined an architecture for Long Term Evolution (LTE) networks where macro base stations (so-called 'evolved Node B', 'eNB' or 'macrocell') and small base stations (so-called 'Home eNB', 'HeNB' or 'small cell') may simultaneously be deployed to improve data carrying capacity and network throughput. In the specification, eNB refers to a macro base station whereas HeNB refers to a small cell base station.

Small cells include consumer-deployed mini base stations that use the Internet as backhaul (DSL, cable etc.) to provide cellular services to consumer's premises. Small cells may also be deployed within commercial areas such as malls and enterprise offices. Obviously, it is required that small cells avoid interference with the macrocells and neighboring small cells through a careful power control, frequency and time allocation. Therefore, small cells in close proximity to each other need to somehow coordinate the use of all network resources.

Although 3GPP provides standards for base stations to form direct links to the Operations & Maintenance (OAM) components of the network for configuration and to interface with one another (i.e., X2 interface) to share certain set of information, dynamic management of interference between base stations still remains unaccounted for. When a small cell is auto-configured, it needs to discover the radio environment and learn about the properties of nearby base stations, which is used by the small cell base station to control the frequency, time and transmission power in use. Thus, the LTE small cell base station needs to detect its neighbors, and if the frequency band and time slot it intends to use is already occupied by another nearby small cell base station, it must either avoid that band or negotiate with the neighbor base station a partitioning of the band and/or other resources dynamically. Furthermore, if it is the 'critical' base station as defined in this invention, it may have to decrease its power usage. In order to perform these steps, a neighbor topology discovery procedure is executed between neighbor base stations forming the main part of the invention. Note that the frequency domain, time domain and power domain resource partitioning are combined.

There are several prior art related to interference management. For example, in the published U.S. Patent Application 20110249642 entitled, "Adaptive Resource Negotiation between Base Stations for Enhanced Interference Coordination" by Song et al., methods and apparatus for supporting adaptive resource negotiation between eNBs for enhanced inter-cell interference coordination (eICIC) are provided. What is disclosed is a resource status message sent by a first base station to a second base station and a proposed resource partitioning status message prepared by the second base station which takes into account the resource status message received from the first base station and optionally a number of parameters related to resource usage. The basic idea is to eliminate interference by making the base stations yield some of the resources that are concurrently being used for the sake of the other base station. In a radio access system using orthogonal frequency division multiplexing (OFDM) such as LTE systems, the yielded resources may be time based, frequency based, or a combination. Thus, this application proposes a method to realize sharing of bands between closely-located (dangerous) small cells, where the interfering base station yields subcarriers in the frequency domain. This is accomplished in a distributed manner through message exchanges between two base stations to make a decision regarding partitioning of resources between the two, without resorting to a central management entity. However, this patent application does not discuss the topology discovery between small cells.

In the published U.S. Patent Application 20090081955 entitled, "Method for Reducing Interference in a Cellular Radio Communication Network, Corresponding Interference Coordinator and Base Station" by Necker, there is a central interference coordinator which receives interference parameters in the form of measurement reports from base stations at predefined time intervals. The central coordinator determines resource allocation and not the base stations themselves. Unlike the current invention, this algorithm does not work in real time, since the central coordinator awaits interference parameters from base stations and there is a delay associated with the reporting of these parameters which takes place at preset times.

To complement techniques that assign sub-bands (group of subcarriers) to different base stations with those which perform power adjustment, in the International Patent Application No. PCT/GB2012/052511 methods of controlling the power allocated to different sub-bands by individual base stations are introduced. These methods aim to increase power in a particular sub-band only if it is advantageous to do so, where one or more users will enjoy higher bit rates or higher qualities of service. For implementing such a method, base stations need to exchange information regarding the sensitivities of the users they serve to powers allocated in that sub-band by other base stations.

The prior art, however, fails to teach an interface between base stations that allows for topological discovery to enable coordinated resource usage.

SUMMARY OF THE INVENTION

This invention provides a description of an interface and a method to combine frequency, time and power domain resource partitioning between neighbor small cells whereby these cells can execute the partitioning, without resorting to a centralized management system, simply by periodically sharing topology-related and interference related information with one another. This scheme allows resource partitioning to be executed in real-time as more small cells are deployed into the network.

The present invention provides a method for wireless communications as implemented in a first base station comprising: transmitting a neighbor topology request message to a second base station, the neighbor topology request message soliciting neighbor topology information (e.g., received SINR and/or SIR from other base stations, an indication of physical distance of each neighbor base station to the second base station) regarding one or more neighbors associated with the second base station; receiving, from the second base station, a neighbor topology response message comprising the neighbor topology information regarding one or more neighbors associated with the second base station; and partitioning one or more network resources according to the received neighbor topology response message.

In one embodiment, the above-described method further comprises: receiving a reciprocal neighbor topology request message from the second base station, the reciprocal neighbor topology request message soliciting neighbor topology information regarding one or more neighbors associated with the first base station; and transmitting, to the second base station, another neighbor topology response message comprising the solicited neighbor topology information regarding one or more neighbors associated with the first base station.

In one embodiment, the above-described neighbor topology information regarding one or more neighbors associated with the second base station further comprises one or more parameters associated with a degree of connectivity (e.g., first degree, second-degree, n-degree, etc.) of the neighbors associated with the second base station.

In one embodiment, the above-described neighbor topology request message and the neighbor topology response message are received via an X2 or S1 interface.

In one embodiment, the above-described neighbor topology request message and the neighbor topology response message are received via an over-the-air interface.

In one embodiment, the above-described method uses an X2 setup or eNB configuration update procedure to embed the contents of the neighbor topology information in the standard messages of those procedures exchanged between the first base station and second base station.

In one embodiment, the above-described method further comprises, after receiving the neighbor topology response message, transmitting, to the second base station, a proposed resource adjustment message (having time-slot sharing information, frequency and time-slot sharing information, frequency sub-band sharing information, proposed power level adjustment information, etc.) between the first base station and the second base station. Optionally, a notification that the proposed resource adjustment message was accepted or rejected by the second base station may be received from the second base station, and network resource utilization may be adjusted based on the notification.

In one embodiment, the above-described method further comprises: determining, based on the received neighbor topology response message, if the second base station is topologically close to cause interference; identifying frequency sub-bands in use for the second base station; selecting from an available set of frequency sub-bands, a subset of sub-bands orthogonal to the identified frequency sub-bands in use; and sending a proposed resource adjustment message to the second base station proposing the selected subset of orthogonal sub-bands. Optionally, when the proposed resource adjustment is not accepted by the second base station, an alternative proposed resource adjustment message may be sent, with a notification message indicating acceptance or rejection of the alternative proposed resource adjustment.

In one embodiment, the present invention provides a method for wireless communications as implemented in a first base station comprising: sending a neighbor topology request message to a second base station, the neighbor topology request message comprising neighbor topology information associated with the first base station and a solicitation for neighbor topology information associated with the second base station; receiving, from the second base station, a neighbor topology response message, the neighbor topology response message comprising the neighbor topology information associated with the second base station; and partitioning one or more network resources according to the neighbor topology information associated with the first base station and the neighbor topology information associated with the second base station.

In one embodiment, the present invention provides a method for wireless communications as implemented in a first base station comprising: transmitting a first neighbor topology request message to a second base station and a second neighbor topology request message to a third base station, the first and second neighbor topology request messages soliciting neighbor topology information regarding one or more neighbors associated with the second base station and third base station, respectively; receiving, from the second base station, a first neighbor topology response message comprising the neighbor topology information regarding one or more neighbors associated with the second base station, and receiving, from the third base station, a second neighbor topology response message comprising the neighbor topology information regarding one or more neighbors associated with the third base station; determining, from the first and second neighbor topology response messages that the first base station has more first degree neighbors than both the second and third base stations; and reducing power of the first base station based on the determination. Optionally, the method in this embodiment further comprises sending a proposed resource adjustment message to the second and third base stations indicating the power reduction.

In one embodiment, the present invention provides a method for wireless communications as implemented in a first base station comprising: transmitting a first neighbor topology request message to a second base station and a second neighbor topology request message to a third base station, the first and second neighbor topology request messages soliciting neighbor topology information regarding one or more neighbors associated with the second base station and third base station, respectively; receiving, from the second base station, a first neighbor topology response message comprising the neighbor topology information regarding one or more neighbors associated with the second base station, and receiving, from the third base station, a second neighbor topology response message comprising the neighbor topology information regarding one or more neighbors associated with the third base station; determining, from the first and second neighbor topology response messages that the first base station has same first degree neighbors as the second base station, but more first degree neighbors than the third base station; and reducing or incrementing power of either the first base station or the second base station based on the determination and at least one of the following: total SINR received by each base station, distance-wise closeness of the first base station's first degree neighbors, and distance-wise closeness of the second base station's first degree neighbors. Optionally, the method in this embodiment further comprises sending a proposed resource adjustment message to the second and third base stations indicating the power modification.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's

DESCRIPTION OF THE PREFERRED EMBODIMENTS

Figure 1:
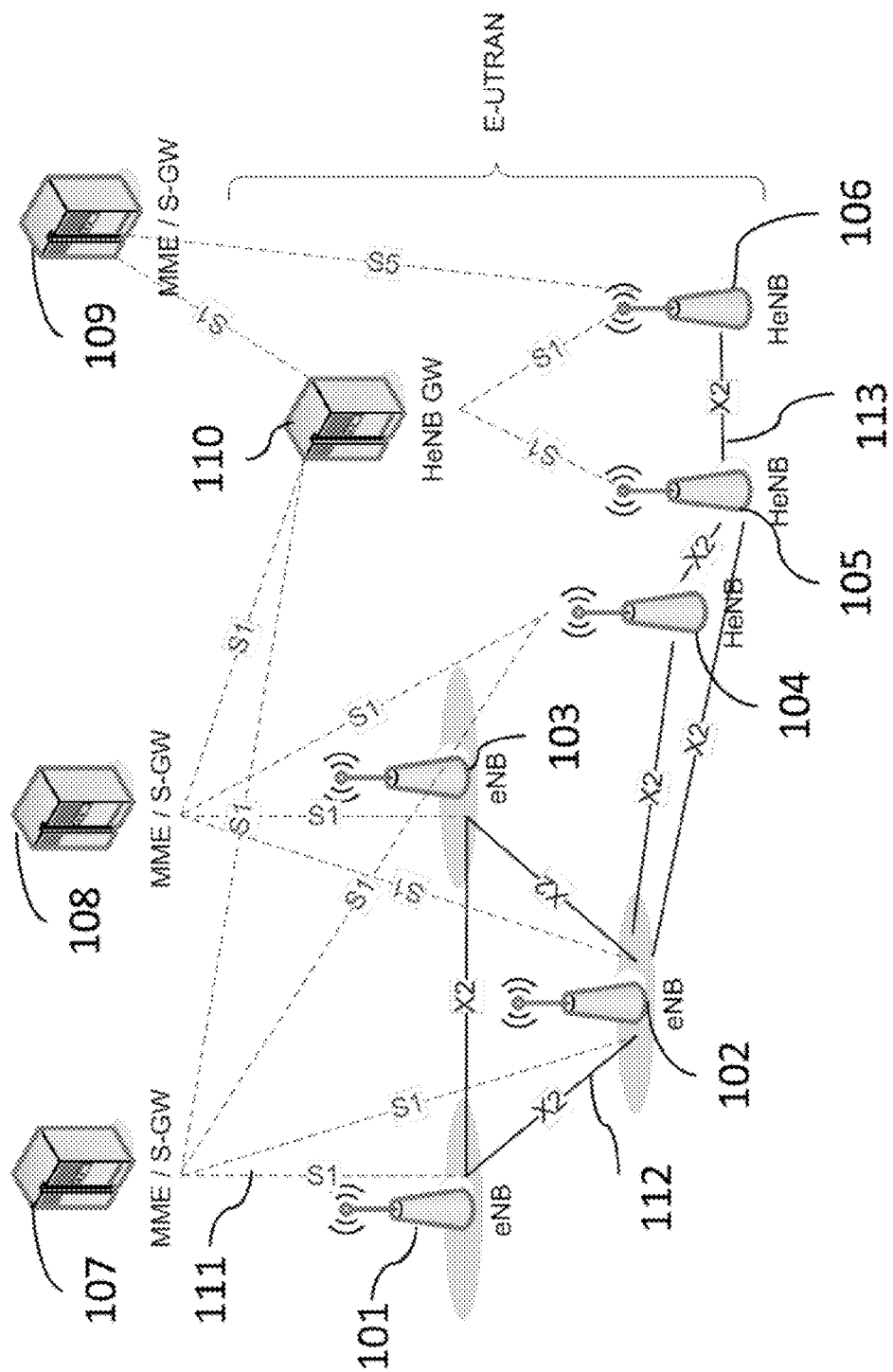
FIG. 1 illustrates fundamental LTE network architecture components.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" means that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

While prior art focuses on spectrum sharing and interference management among small cells generally using OAM function at the time of configuration, we propose a new model that enables small cells to cooperate to improve their performance by sharing spectral resources and dynamically adjusting frequency, time and power usage. Each small cell can use an algorithm to take a decision and self-organize into a new network partitioning composed of disjoint frequencies, time slots and adjusted power settings to minimize interference. In simplest terms, interference is caused by the use of the same frequency at the same time slot amongst neighbor base stations. Received Signal to Interference and Noise Ratio (SINR) known in prior art is used as the key measure of interference. As SINR received from a transmission unit increases, the signal becomes more powerful than the total noise plus interference from other transmission units; whereas a low SINR indicates strong noise plus interference power in the presence of low signal power. Received SINR will be used as a key topology determinant as it is also an indirect indication of distance between cells.

As illustrated in FIG. 1, a typical LTE network is comprised of eNBs 101, 102 and 103, and a group of HeNBs 104, 105 and 106, all located in the vicinity of eNB 102. The interactions between eNBs (including HeNBs) may take place along interfaces 112 and 113 which are defined in LTE standards as the X2 interface.

A group of eNBs are served by a Serving Gateway (S-GW) and a Mobility Management Entity (MME) 107. Note that an eNB and a group of HeNBs in its vicinity may be served by the same MME/S-GW 108. A group of HeNBs may be optionally served by a HeNB-Gateway (HeNB-GW) 110. HeNB-GW 110 comprises a security gateway that terminates large numbers of encrypted IP data connections from hundreds of thousands of HeNBs, and a signaling gateway, which aggregates and validates the signaling traffic, authenticates each small cell and interfaces with the mobile network core switches using standard protocols. The HeNB-GW essentially resides between a group of HeNBs and the core network and performs the necessary aggregations and/or translation functions to ensure that the HeNBs appear as standard eNBs to the core network. Each HeNB talks to HeNB-GW 110, and HeNB-GW 110 in turn talks to MME/S-GW 109 as illustrated in FIG. 1. The interactions between eNBs, HeNBs and serving gateways (i.e., MME and S-GW) are carried out through interface 111 and defined in LTE S1 interface standards.

Self Organizing Networks (SON) is a function in the LTE network that is vital in enabling effective network operations. SON functions can be divided into three categories:
Self-Configuration
Self-Optimization
Self-Healing In this invention, we will mainly be focusing on the use cases of Self-Optimization; primarily Coverage and Capacity Optimization (CCO), Interference Reduction and Inter-cell Interference Coordination (ICIC) as defined by 3GPP in Technical Report 36.942. Inter-Cell Interference Coordination (ICIC) is one of the most powerful mechanisms, together with the RF optimization, to reduce the overall interference and to gain better network performance.

Since LTE systems use orthogonal frequency division multiple access (OFDMA) and single carrier frequency division multiple access (SC-FDMA) at the physical layer, interference has to be coordinated on the basis of the Physical Resource Blocks (PRBs). The aim of SON is to fine-tune the control parameters of Radio Resource Management (RRM) ICIC schemes for uplink (UL) and downlink (DL) ICIC. There are three basic interference management techniques, which are frequency domain, time domain and power domain resource management. In this invention, we will combine these approaches.

Prior art has focused on the interference problem amongst macrocells, and between macrocells and small cells, completely neglecting the inter-small cell interference. As the small cells get denser in an area, the interference between them becomes more significant. Considering the fact that small cell neighbor topology changes dynamically, setting up each small cell at the time of configuration for network resource utilization by the OAM function is not sufficient. Each small cell must be sensing the network utilization by its neighbors and must adjust its resource utilization cooperatively.

Figure 2:
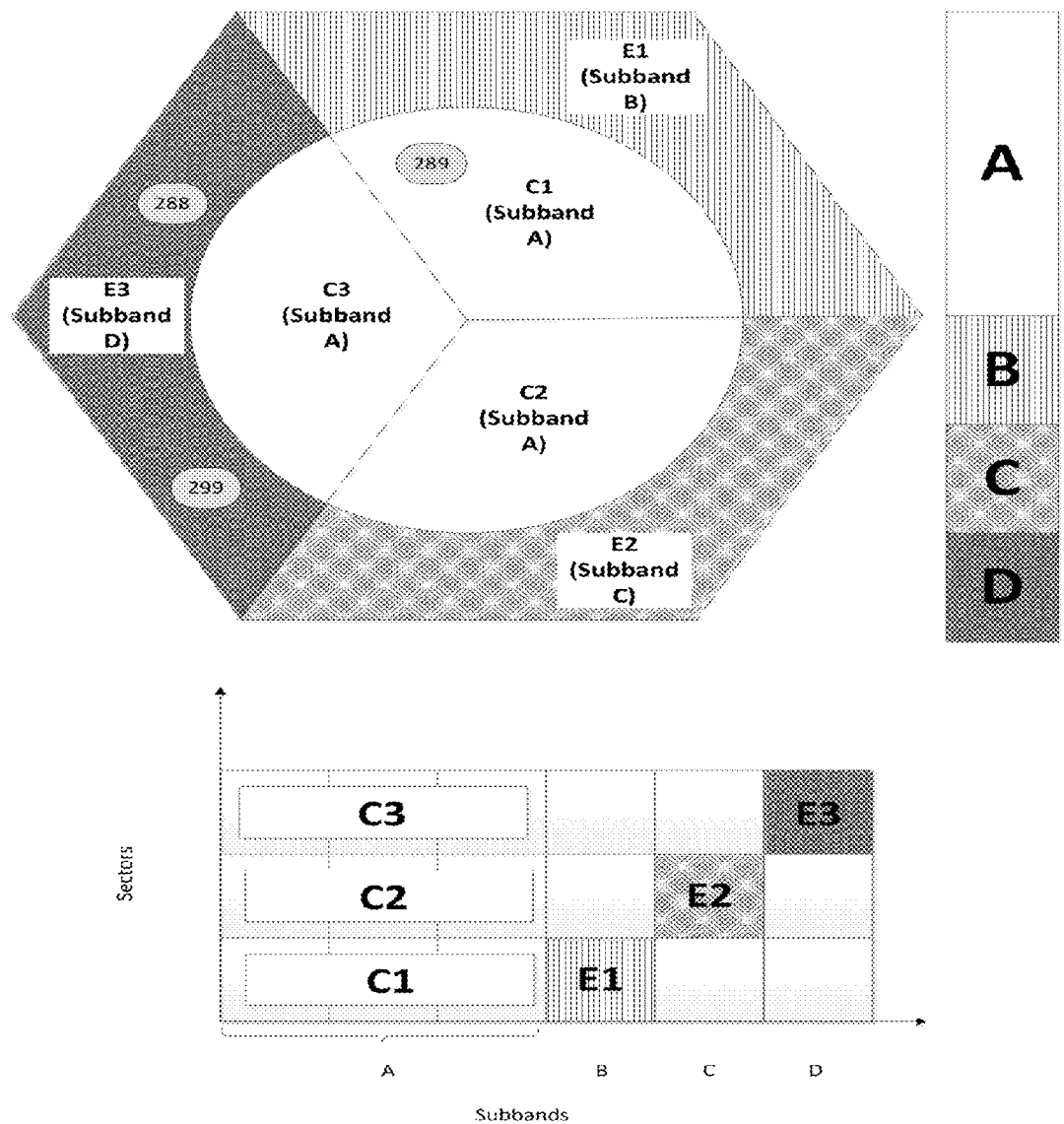
FIG. 2 illustrates fractional frequency reuse-3 (FFR-3) regions.

In order to understand the proposed cooperative interference and power management function of a small cell, we must understand the prior art interference management techniques. For example, Fractional Frequency Reuse (FFR) is a prior art interference management approach, which is an inter-cell interference control geared towards interference between macrocells. FFR controls the interference in cell edges to enhance the frequency reuse factor and performance by dividing the cell into a central and an edge region. FFR-3 is a version of FFR where every cell has three sectors, divided into center and edge regions based on an SINR threshold as illustrated in FIG. 2. Accordingly, available frequency spectrum is divided into four sub-bands, in general one larger and three smaller and equal parts; so that the larger part is used in the center region and three different sub-bands are used per sector edge.

Note that FIG. 2 illustrates an FFR-3 region where a macro cell is located in the center of the cell the shape of whose coverage region is modeled using a hexagon, surrounded by a circular central region, and three equal-area edge regions denoted by E1, E2, and E3. The hexagonal cell shape is a theoretical but reasonable approximation of the coverage region of a macrocell which lends itself to an easier analysis of wireless cellular systems. While central sector uses frequency sub-band A, regions E1, E2 and E3 use B, C and D, respectively. These sub-bands represent disjoint frequencies. With the FFR-3 allocation scheme, a small cell physically located in an FFR-3 region may select sub-bands which are not being used in that region in order to minimize the interference between macrocells and small cells. In addition to this, if the small cell is located in the center-region, it not only excludes the use of center region's sub-band but the sub-band that is used by the slice of the edge-region since the signal power received from the edge-region of the cell is relatively strong for this small cell. For that reason, the central sector is subdivided into C1, C2 and C3, parts of central sector adjacent to E1, E2 and E3, respectively. Using this logic, for example, small cell 289 shown in FIG. 2 located in the center region C1 would select the frequency sub-bands (D, C), while small cells 288 and 299 located in edge region E3 would select the frequency sub-bands (A, B, C).

This scheme greatly avoids the interference between macrocells and small cells, but it must be further enhanced in order to mitigate inter-small cell interference. Especially, with a deployed base of large number of small cells, the interference issue becomes a major problem. Managing both types of interferences in real-time as more small cells are added to the network and frequency use patterns change, can improve the overall network efficiency while significantly enhancing the throughput for small cells.

Proposed method of this invention remedies the problem of two or more small cells that are located in the same region of FFR-3 scheme causing interference to each other and reducing the overall throughput of these small cells. For example, small cells 288 and 299 which are both located in edge region E3, and eligible to select from frequency sub-bands A, B and C, may select autonomously frequency sub-band A which will cause interference to one another. When the small cells are physically far apart, selecting the same frequency sub-band is a less significant issue, as interference on the same sub-band created by the other small cell (hence received SINR from other small cell) will be relatively low. However, if the small cells are close neighbors (distance-wise or received signal-power-wise), a high level of interference between these cells will be inevitable. Thus, by knowing the small cell topology, it is possible to adjust the frequency or time partitioning between small cells to minimize frequency interference. Simultaneously, the power usage of these small cells can also be adjusted in real-time to further reduce interference.

What is described in this invention is a method and a base station-to-base station interface capability which allow each small cell to discover neighbor connectivity topology (neighborhood graph) to implement two key methods based on the knowledge of interference graph topology of small cells and the usage of network resources, and cooperate with one another to partition network resources to minimize interference. Two methods are implemented sequentially:

1. A method to partition and negotiate the available frequency sub-bands orthogonally between those closely located small cells, so-called dangerous neighbors, where the closeness is identified from the perceived strength of SINR and/or the physical distance (either received from the neighbor or measured). Doing so, the topology corresponding to different sub-bands may become different; and/or
2. Adjusting the transmission power of that small cell, with lots of active neighbors in a specific sub-band topology, a so called critical neighbor, to minimize inter-small cell interference. Such neighbor relation information is received from the neighbor small cells. It may also be requested from the Automatic Neighbor Relation (ANR) function of OAM. If a small cell (node) in the graph has the largest number of neighbors compared to its first-degree neighbors in the same frequency sub-band, then it declares itself as the critical neighbor. Otherwise, it is not a critical neighbor. However, if the node has the same number of neighbors with any of its first degree neighbors (let's call that the other node), but this number is larger than all other first degree neighbors, then the node and the other node both compare the sum of all received SINR values from their neighbors, so that the critical neighbor with the largest interference, meaning the one which has its neighbors closer is selected as the critical neighbor. The selected critical neighbor must reduce its transmission power. The power reduction (PR) is proportional to the number of neighbors for that critical small cell. PR is determined algorithmically or can be manually configured. PR can be adjusted in real time. Optionally, the first-degree neighbors of critical HeNB can alter their transmission powers in specified sub-bands. The power increase (PI) can also be determined algorithmically and be adjusted in real time.

Figure 3A:
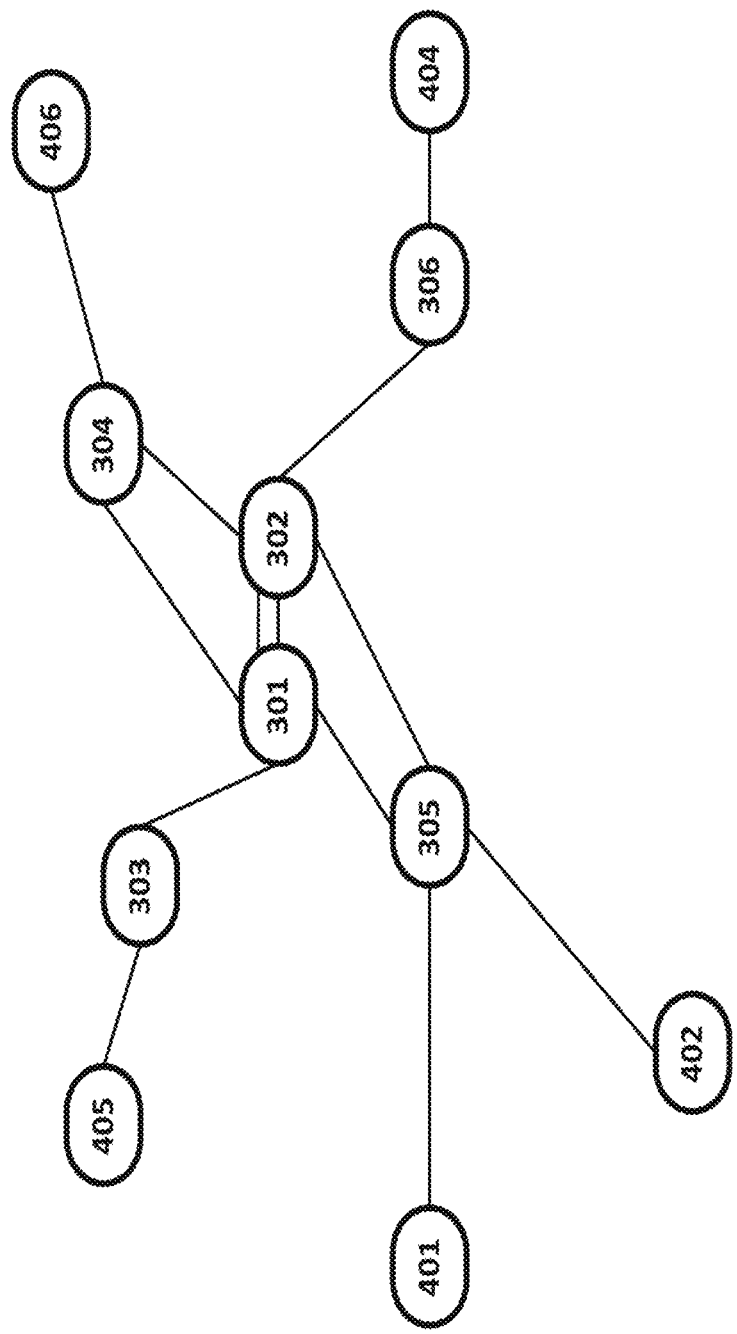
FIG. 3a illustrates example small cell network topology for sub-bands A and B.

In order to demonstrate the concepts above, consider a simple 11-node small cell graph shown in FIG. 3a. Let's assume that initially all nodes are using frequency sub-bands A and B. In this graph, 302, 303, 304 and 305 are the first order neighbors of 301 while 306, 401, 402, 405 and 406 are the second order neighbors. Table 1 shows the first order neighborhood relation table for nodes 301, 302, 303, 304, 305 and 306. The neighbors for the rest of the nodes are not shown for brevity.

TABLE 1

Neighbor Table

| Node | Neighbor | Neighbor | Neighbor | Neighbor |
|---|---|---|---|---|
| Node 301 | 302 | 303 | 304 | 305 |
| Node 302 | 301 | 304 | 305 | 306 |
| Node 303 | 301 | 405 | — | — |
| Node 304 | 301 | 302 | 406 | — |
| Node 305 | 301 | 302 | 401 | 402 |
| Node 306 | 302 | 404 | — | — |

Figure 3B:
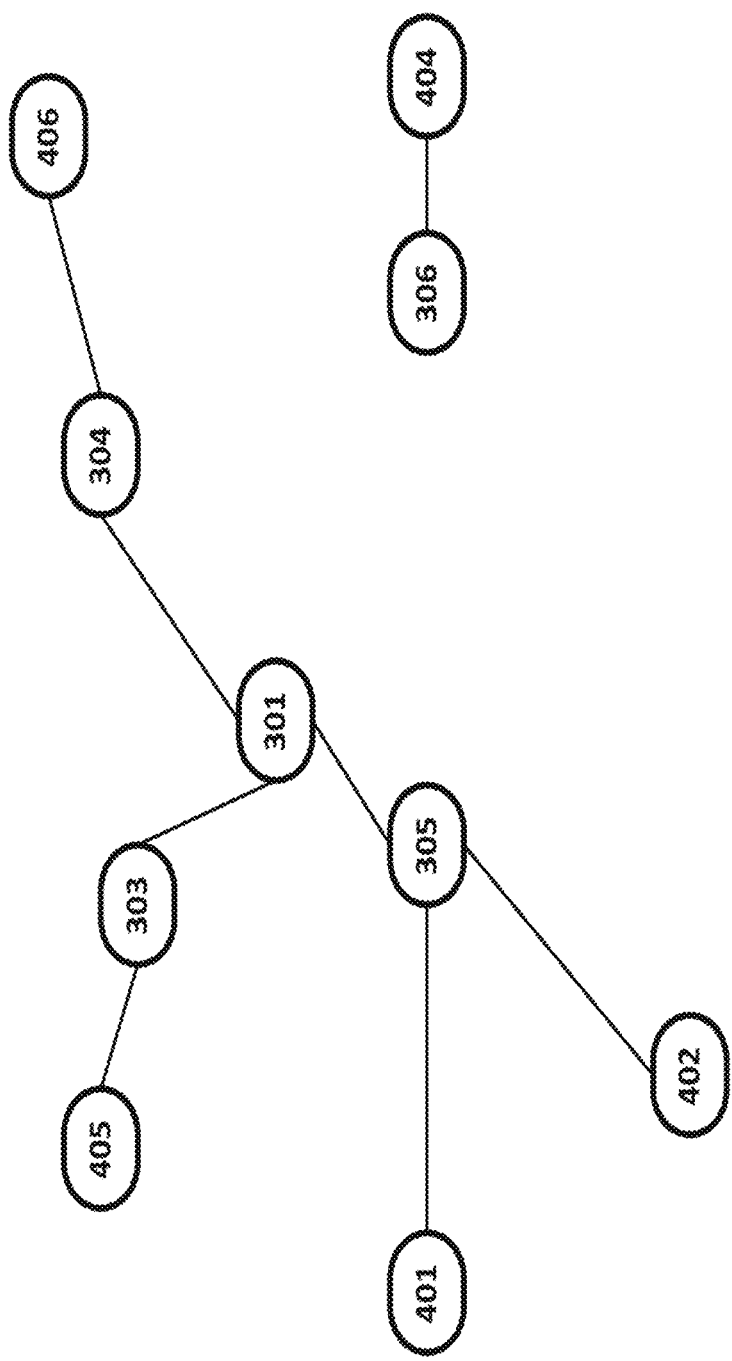
FIG. 3b illustrates example network topology for sub-band A.
Figure 3C:
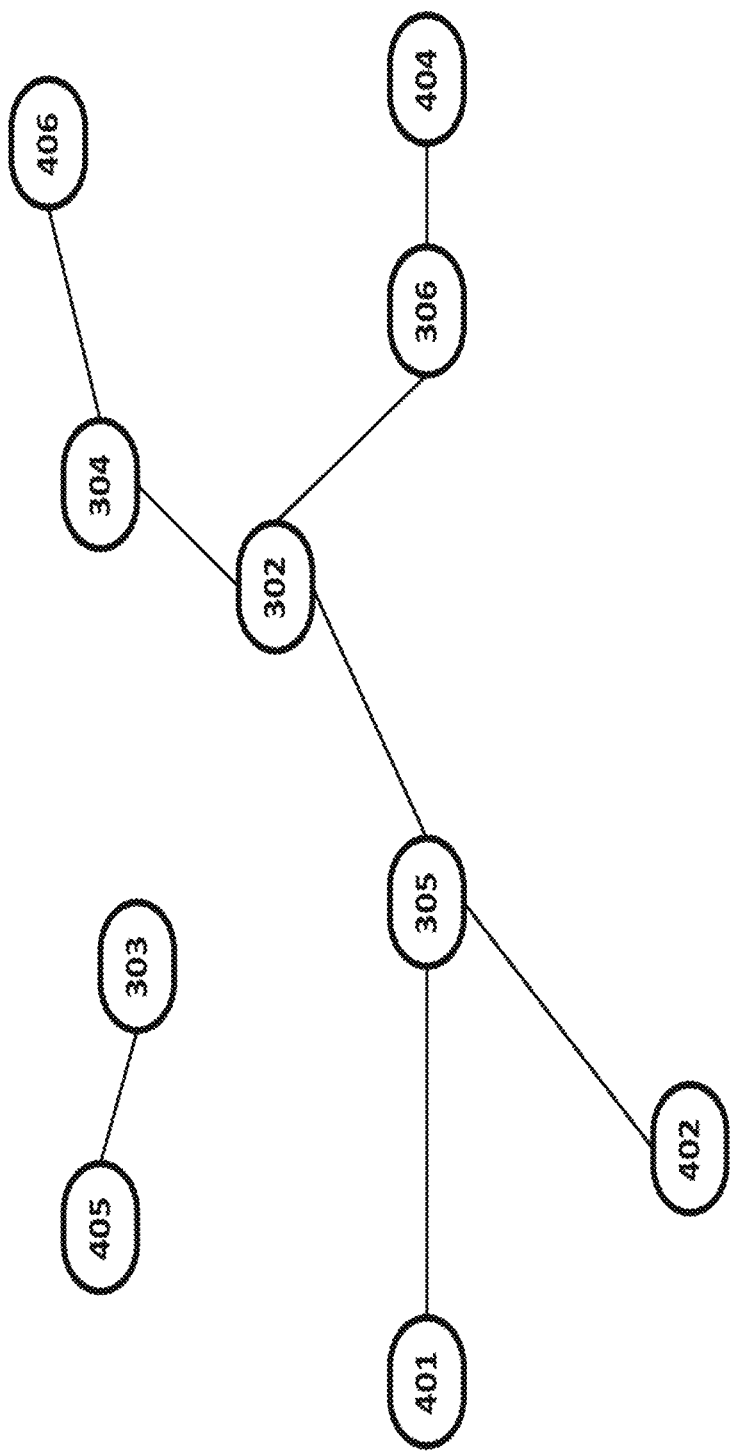
FIG. 3c illustrates example network topology for sub-band B.

When a new HeNB is deployed in the network, it will start sniffing the received SINR values and classify each node by checking to see if these values are higher than SINR_threshold_2 and SINR_threshold_1, where SINR_threshold_2 is smaller than SINR_threshold_1. By doing so, the HeNB creates two tables: Dangerous Neighbor Table (DNT) which includes the nodes whose received SINR values are greater than SINR_threshold_1 which is the larger of the two thresholds, and Neighbor Table (NT) which contains the nodes with received SINR values greater than SINR_threshold_2. Note that DNT and NT are created for each sub-band being used by the nodes in the network. Also note that initially DNT is a subset of NT. Our goal is to empty out DNT and reorganize NT accordingly after the sub-band partitioning between dangerous neighbors. For example, either or both of Nodes 301 and 302 determine that the received SINR value from the other node exceeds SINR_Threshold_1. Accordingly, Nodes 301 and 302 may partition the sub-bands in such a way that 301 uses only sub-band A while 302 uses only sub-band B. The other nodes continue to use both A and B as they are neighbors to one another but not dangerous neighbors. After the partitioning of sub-bands between 301 and 302, the network topology corresponding to frequency sub-band A and sub-band B are shown in FIGS. 3b, and 3c, respectively. The cooperative frequency sub-band selection described in Method-1 above has created two different network topologies for frequencies A and B. The network topology for sub-band A, (when node 302 is removed) is illustrated in FIG. 3b. Similarly, when node 301 is eliminated according to FIG. 3c, a different neighbor topology is obtained for sub-band B. Note that the Neighbor Table (NT) corresponding to sub-bands A and B after the dangerous neighborhood relationship between 301 and 302 caused the partitioning of sub-bands between these two nodes are different per FIGS. 3b and 3c, respectively. As an example, the NT for node 304 was initially (301, 302, 406) for both sub-bands A and B. After the partitioning, the NT for 304 is now (301, 406) for sub-band A and (302, 406) for sub-band B.

Per this invention, the communications between a small cell and its first degree (and potentially, the second and third degree) neighbor using either the X2 interface or any other interface over the air or through the backhaul must exchange with one another one or more of the following:

Number of its neighbors (as observed by each node)
Received SINR values observed from all its first degree neighbors
Distance to its first degree neighbors (GPS or delay)
Power level modification
Time slots that are being used by small cell
SINR thresholds used by small cell
Previous SON sniffing time
Loading information of the small cell Technique of Method-1 is based on (a) estimating the graph distances between a small cell and all its neighbors (for example, using at least the SINR sensed from each neighbor), (b) determining if there are any dangerous neighbors, (c) if there are dangerous neighbors, determining a partitioning of the frequency sub-bands and time slots between the small cell and its dangerous neighbor and (d) communicating the proposed partitioning to the dangerous neighbor and negotiating the selection with that neighbor using an interface. The goal is to obtain the Neighborhood Table (NT) in each small cell for each sub-band it uses after the elimination of dangerous neighborhood relations. This table is updated in real-time as new small cells are deployed in the network or when there are changes in network usage patterns.

Technique of Method-2 is based on (a) each small cell communicating with its first order neighbors in its NT per sub-band it uses (obtained after executing Method-1), the number of neighbors it has (e.g., 304 communicating with 301 and 406 in sub-band A that it has 2 neighbors at that sub-band, and communicating with 302 and 406 in sub-band B that it also has 2 neighbors at that sub-band), (b) receiving the reciprocal information from its first order neighbors, (c) determining if itself is a critical neighbor, i.e. has the most number of first degree neighbors compared to its first degree neighbors, and (d) if so, decreasing its power proportional to the number of neighbors it has (i.e., the more number of neighbors the more reduction in power), optionally (e) sending power increase recommendation to all of the first-order neighbors (i.e., critical node sacrificed itself for the sake of its neighbors). Note that node 304 is not a critical neighbor in either sub-band B or sub-band A, since 302 and 301 have more neighbors than 304 in sub-band B and sub-band A, respectively. In this scenario, 301 in sub-band A and 302 in sub-band B must decrease power.

If a small cell has prepared its Neighborhood Table (NT) it can exchange that information with its neighbors. That means the small cell does not have to know all small cell locations in the entire geography. It only needs the relevant neighbor topology which can be obtained from the neighbors. So, a central management system that oversees the entire topology is not needed.

In summary, the method and system of this invention employs the following key steps in a small cell in real-time to select frequency band, time slot and transmission power to use:

As part of Method-1, determine and prefer frequency sub-bands which are not used in the macrocell sub-area in order to avoid interference between macrocell and small cell; and if the small cell stands in the center-region, exclude the sub-band that is used by macrocell in the edge-region of current sector as well since the signal power received from the edge-region of macrocell is relatively strong; and Determine the small cell's neighbors and construct the NT per sub-band (and potentially per time slot). Also determine closely located small cell neighbors (dangerous neighbors) and construct the DNT per sub-band. If a node has dangerous neighbors, then partition the available frequency sub-bands (available sub-carriers) (from the first step) and available time slots orthogonally with these neighbors. Note that the geographical distance or SINR_threshold corresponding to a dangerous neighbor relation is a parameter that can be set within the small cell by the small cell itself or another entity in the network.

After each partitioning of frequency and time slots between a pair of dangerous neighbors, update the NT for each sub-band in each small cell that previously exhibited a dangerous neighborhood relationship. At the end of this process, the DNT must be empty (unless partitioning is impossible because of resource unavailability or possible other reasons). If there are no entries in the DNT to start with, then no update is needed in the NT. If there are entries in the DNT, but a partitioning can not be negotiated or is impossible, then continue with the existing NTs per sub-band;

Subsequently, on the small cell's sub-band (and time slot) NT, apply Method-2 to determine the connectivity degree of each neighbor. If a small cell has the largest number of first degree neighbors (critical) for example, then it will reduce its transmission power in a way proportional to number of neighbors it has. If a small cell was a critical neighbor but at a future time a new neighbor is deployed and the criticality has changed location in the graph accordingly, increase the power for a specified percentage. This is done by using an optional suggestion received from the new critical node for power modification.

As stated before, a small cell can prepare its NT solely using the information it obtains from its neighbors and it can exchange this information with its neighbors. The small cell does not have to know all small cell locations in the system. It only needs its neighbors' information, so a central management system is not needed for managing the interference. Each small cell can autonomously run the same algorithm and come up with the same result. The beauty of the algorithm is that each small cell only needs to communicate with its first degree (adjacent neighbors) adjacent small cells. No further network related data or a reach to second degree neighborhood is needed. Note that the actual distance to qualify two small cells as either dangerous neighbors or other neighbors is an input of the algorithm. Although second and third degree neighbor information is not needed for the methods specified here, one can design an interface where such information is also obtained for a decision that potentially entails more detailed network knowledge.

Figure 4:
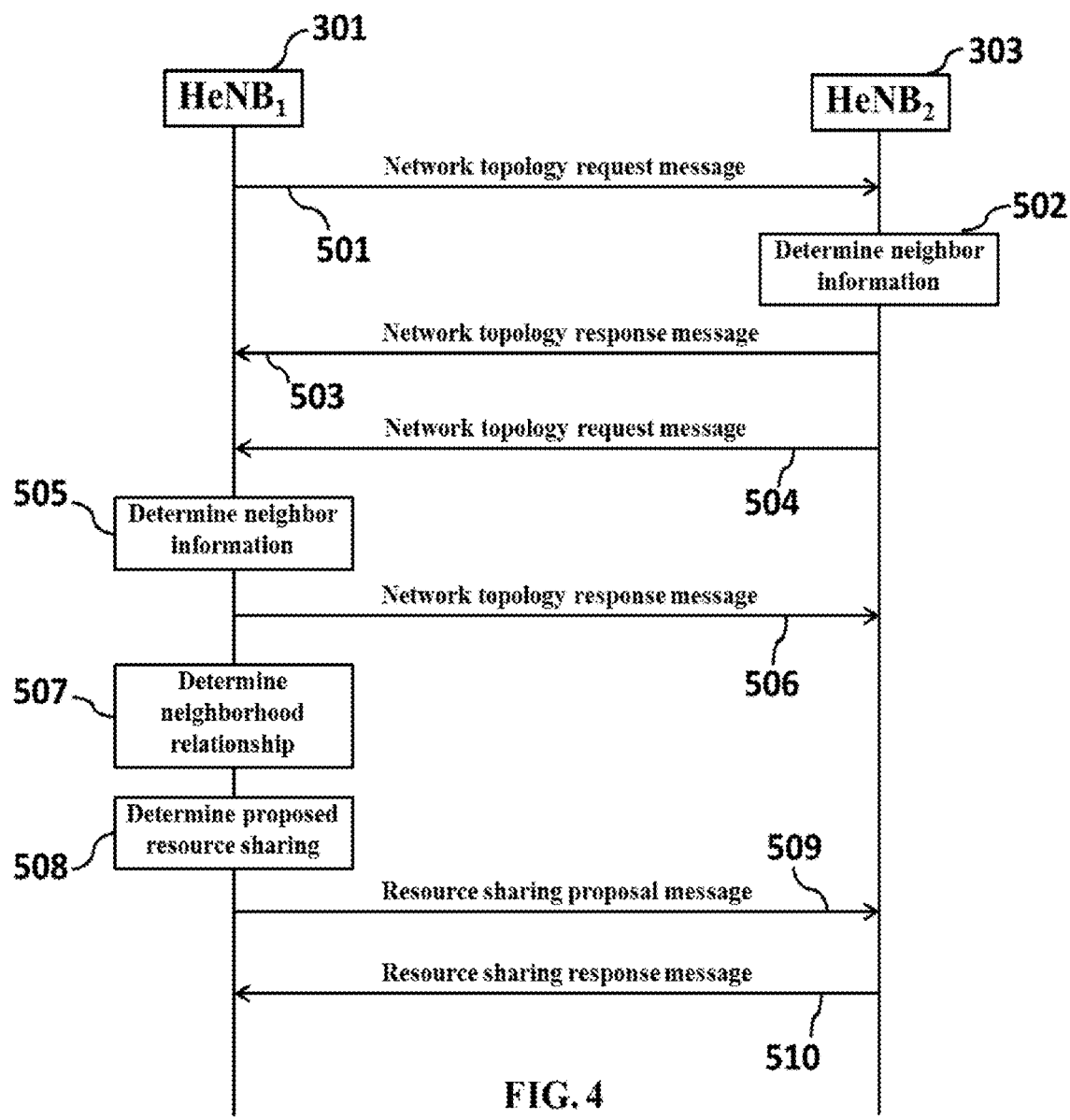
FIG. 4 depicts the messaging sequence of the proposed method.

FIG. 4 shows the messaging sequence between Small cell 301 and 303. In step 501, Small cell 301 sends a network topology request message to Small cell 303. Small cell 303 in turn determines neighbor topology information in step 502 (i.e., recollects information and perform updates whenever necessary) and responds to the request with a network topology response message in step 503. This message contains the requested topology information pertaining to Small cell 303. Simultaneously, Small cell 303 sends a reciprocal network topology request message to Small cell 301 in step 504. To this network topology request message, Small cell 301 responds with a network topology response message in step 506 after determining neighbor topology information in step 505. Small cell 301 is now ready to determine neighborhood relationships based on its own information and the information it has collected from its neighbors in step 507. The neighborhood information is used to prepare a resource allocation proposal in step 508. Small cell 301 conveys its proposal to small cell 303, possible using the X2 interface and the X2 resource status request procedure, as a resource sharing proposal message in step 509. This proposal may include reduced transmission power for each of the sub-bands and time-slots it is currently using if it is the critical neighbor and also suggestions for small cell 303 to modify the level of power transmitted in the sub-bands and time-slots that small cell 301 uses. Small cell 303 responds with a resource sharing response message in step 510, again possibly using the X2 interface and the X2 resource status response message, indicating acceptance or rejection of the proposed resource scheduling suggestion. This resource status request/response message pair and thus steps 509 and 510 can be used for sharing sub-bands and time slots with dangerous neighbors without directly exchanging topology messages first. Note that the names we used for the new messages are arbitrary. They can be named differently. The information in these messages can simply be carried by modifying existing or adding new data fields in a standard message of an interface such as X2, S1 or X1, or alternatively these messages may constitute an overlay interface.

Figure 5A:
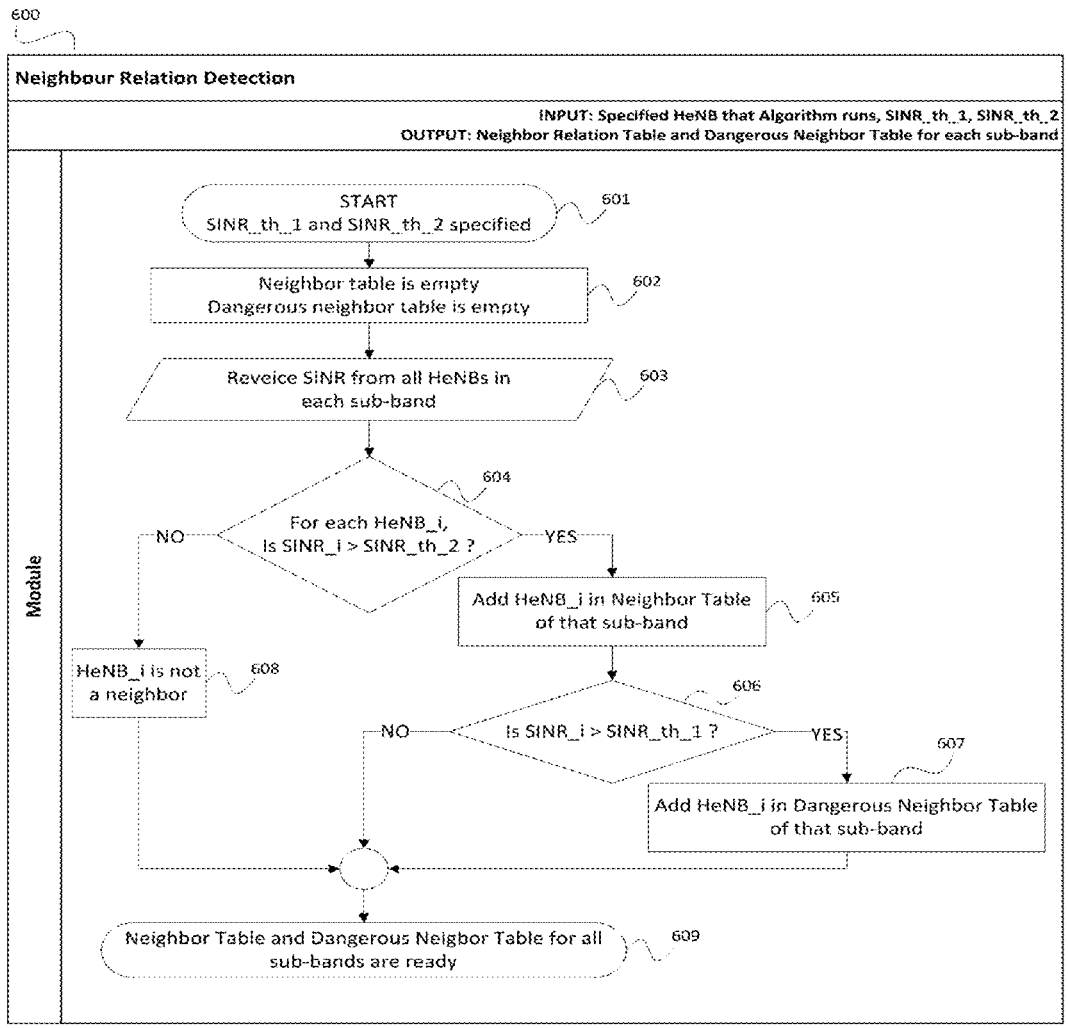
FIG. 5a depicts steps of the neighbor relation detection algorithm.
Figure 5B:
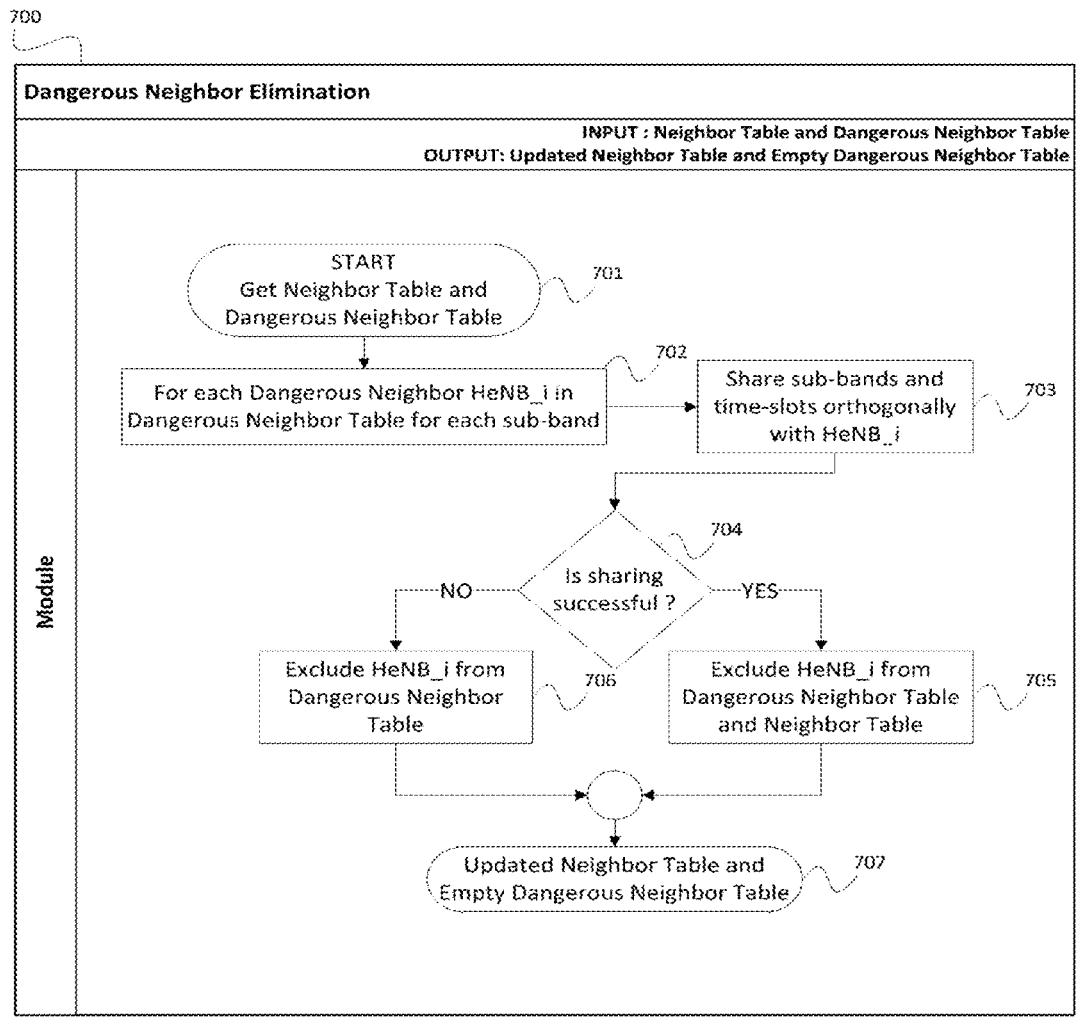
FIG. 5b depicts steps of the dangerous neighbor elimination algorithm.
Figure 5C:
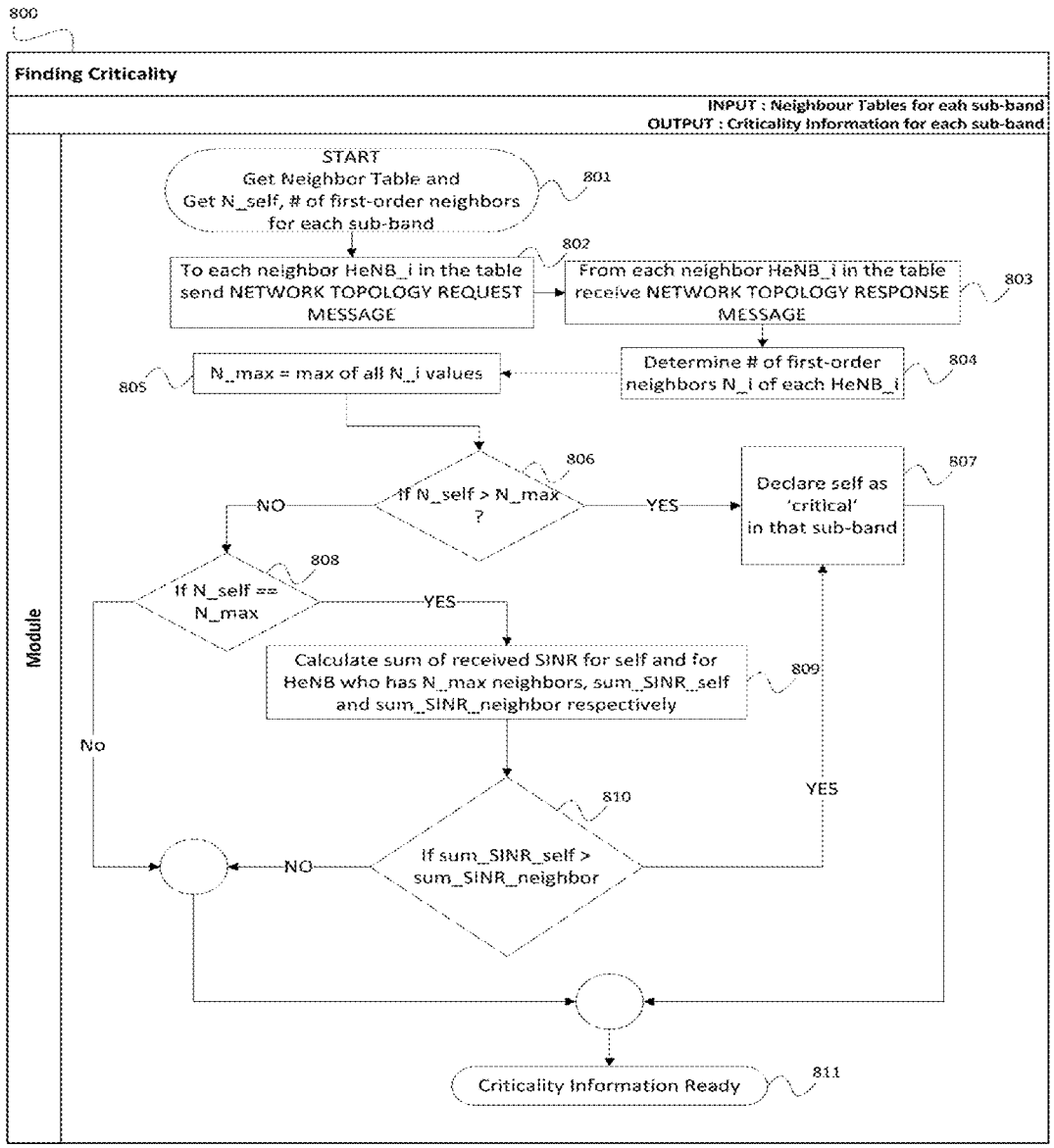
FIG. 5c depicts steps of finding critical neighbor algorithm.
Figure 5D:
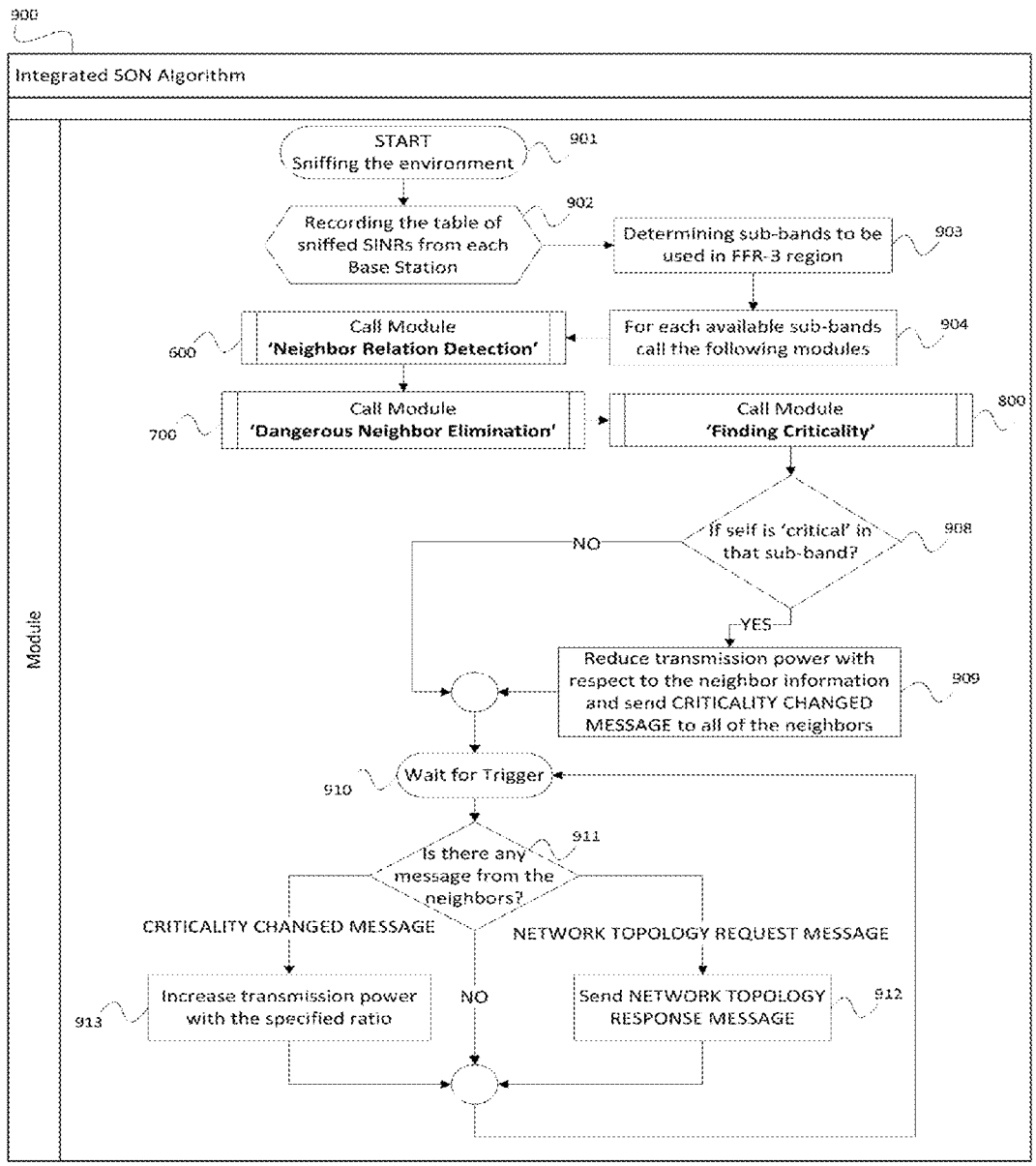
FIG. 5d depicts integrated algorithm.

The algorithm is depicted in FIG. 5a through 5d. In FIG. 5a (module 600), steps of neighbor detection and construction of NT and DNT are described. In FIG. 5b (module 700), steps of dangerous neighbor elimination and resource partitioning are shown. FIG. 5c (module 800) demonstrates steps of critical neighbor detection and power reduction algorithms. Finally, FIG. 5d (system 900) illustrates the overall algorithm which uses the steps above in a sequential fashion.

Assume small cell 301 is deployed in the topology that is depicted in FIG. 3a. Following the steps of module 900, small cell 301 will sniff its environment and record the received signal power (received SINR) from each base-station around in a table as in steps 901 and 902, respectively. In step 903, it will find the sub-bands that are available with respect to the FFR-3 scheme by first understanding the FFR region it resides in from the macro cell measurements recorded in step 902. Once the available sub-bands with respect to the FFR-3 scheme are obtained, step 904 will call module 600 of FIG. 5a to construct the corresponding DNT and NT tables for all available sub-bands. The module 600 requires the received SINR values from other small cells. For each sub-band and time slot, these values will be filtered with respect to SINR_threshold_2 to determine if they are neighbors (those will be added to NT in that sub-band and time pair) as in step 605, and the filtered values will be further filtered using SINR_threshold_1 in step 606 to determine if these neighbors are dangerous neighbors (step 607). Applying the module 600 of FIG. 5a will yield the NTs for 302 in sub-bands A and B that consist of the nodes 301, 304 and 305 and 306. The DNT for 302 is comprised of 301 only.

If there are no dangerous neighbors, the DNT will be empty. However, if DNT is not empty, then in module 700, the DNT table will be cleared by sharing available sub-bands across those dangerous neighbors. Module 700 aims at clearing the dangerous neighbor table by assigning orthogonal resources in time and/or frequency to dangerous neighbors in step 703. This will be executed for each sub-band's DNT table. Thereafter, the DNT will be emptied. If the resources can't be assigned orthogonally, then those neighbors will either be kept in the DNT but marked as 'no resource sharing available' or alternatively, cleared from DNT as in step 706, depending on the implementation. Note that the resource sharing is communicated to the neighbor using the RESOURCE SHARING PROPOSAL REQUEST message. If the assignment is acceptable, the neighbor will respond with a RESOURCE SHARING RESPONSE indicating the acceptance of the new resource assignment. Subsequently, the dangerous neighbor is cleared from all of the tables as in 705. In the case of unaccepted resource assignment, the node will remain in NT as in step 706, since although the problem is not solved in time or frequency domain, it can be optimized in power domain. What is left in FIG. 3a after applying module 700 is an empty DNT, for 301 and 302 are now operating on orthogonal sub-bands, and an NT for each sub-band that reflects the topologies in FIG. 3b and FIG. 3c.

The next step will be to determine the criticality of neighbors for all available sub-bands using module 800 depicted in FIG. 5c. In steps 801, 802, 803 and 804 with the help of the network topology request/response message sequences, small cell 301 will learn its own topology as well as its neighbors'. Small cell 301 learns the number of neighbors each of its neighbors has.

In FIG. 3b, small cell 301 has three neighbors namely, small cells 303, 304 and 305. These neighbors have two, two and three neighbors in turn, respectively. In step 805 of module 800 it will be determined that small cell 305 is the neighbor of small cell 301 with the maximum number of first-degree neighbors. Step 806 will compare this value with the number of neighbors of small cell 301. Since both small cells have three neighbors each and are thus equal in criticality at this stage, the race condition has to be mitigated by comparing the sum of the power received (received SINR) from their neighbors as in step 809. The larger number indicates the small cell which is more seriously exposed to interference. Assume that the small cell 301 has a greater sum of received SINR value due to its first order neighbors compared to small cell 305, since it has its neighbors closer located geographically as shown in FIG. 3b. Therefore, small cell 301 will declare itself as 'critical' in sub-band A as in step 807. Step 909 will cause small cell 301 to reduce its transmission power in sub-band A and optionally send CRITICALITY CHANGED MESSAGE to inform its neighbors about its power reduction and its suggestions of power increase to its neighbors. In step 910, small cell 301 will wait in steady-state until a trigger causes a state change. Say a new node is deployed in the neighborhood, and as a result node 301 is no longer the critical node. This will retrigger the NETWORK TOPOLOGY REQUEST/RESPONSE MESSAGE sequence as in 912. Alternatively, an optional CRITICALLY CHANGED MESSAGE received from a neighbor may cause node 301 to automatically increase power depending on the embodiment.

In one embodiment, the present invention provides a method for wireless communications as implemented in a first base station comprising: transmitting a neighbor topology request message to a second base station, the neighbor topology request message soliciting neighbor topology information (e.g., received SINR, SIR, an indication of physical distance of each neighbor base station to the second base station) regarding one or more neighbors associated with the second base station; receiving, from the second base station, a neighbor topology response message comprising the neighbor topology information regarding one or more neighbors associated with the second base station; and partitioning one or more network resources according to the received neighbor topology response message.

The method may further comprise: receiving a reciprocal neighbor topology request message from the second base station, the reciprocal neighbor topology request message soliciting neighbor topology information regarding one or more neighbors associated with the first base station; and transmitting, to the second base station, another neighbor topology response message comprising the solicited neighbor topology information regarding one or more neighbors associated with the first base station.

The method may further comprise, after receiving the neighbor topology response message, transmitting, to the second base station, a proposed resource adjustment message (having time-slot sharing information, frequency and time-slot sharing information, frequency sub-band sharing information, proposed power level adjustment information, etc.) between the first base station and the second base station. Optionally, a notification that the proposed resource adjustment message was accepted or rejected by the second base station may be received from the second base station, and network resource utilization may be adjusted based on the notification.

The method may further comprise: determining, based on the received neighbor topology response message, if the second base station is topologically close to cause interference; identifying frequency sub-bands in use for the second base station; selecting from an available set of frequency sub-bands, a subset of sub-bands orthogonal to the identified frequency sub-bands in use; and sending a proposed resource adjustment message to the second base station proposing the selected subset of orthogonal sub-bands. Optionally, when the proposed resource adjustment message is not accepted by the second base station, an alternative proposed resource adjustment message may be sent, with a notification message indicating acceptance or rejection of the alternative proposed resource adjustment.

In another embodiment, the present invention provides a method for wireless communications as implemented in a first base station comprising: sending a neighbor topology request message to a second base station, the neighbor topology request message comprising neighbor topology information associated with the first base station and a solicitation for neighbor topology information associated with the second base station; receiving, from the second base station, a neighbor topology response message, the neighbor topology response message comprising the neighbor topology information associated with the second base station; and partitioning one or more network resources according to the neighbor topology information associated with the first base station and the neighbor topology information associated with the second base station.

In yet another embodiment, the present invention provides a method for wireless communications as implemented in a first base station comprising: transmitting a first neighbor topology request message to a second base station and a second neighbor topology request message to a third base station, the first and second neighbor topology request messages soliciting neighbor topology information regarding one or more neighbors associated with the second base station and third base station, respectively; receiving, from the second base station, a first neighbor topology response message comprising the neighbor topology information regarding one or more neighbors associated with the second base station, and receiving, from the third base station, a second neighbor topology response message comprising the neighbor topology information regarding one or more neighbors associated with the third base station; determining, from the first and second neighbor topology response messages that the first base station has more first degree neighbors than both the second and third base stations; and reducing power of the first base station based on the determination. Optionally, the method in this embodiment further comprises sending a proposed resource adjustment message to the second and third base stations indicating the power reduction.

In another embodiment, the present invention provides a method for wireless communications as implemented in a first base station comprising: transmitting a first neighbor topology request message to a second base station and a second neighbor topology request message to a third base station, the first and second neighbor topology request messages soliciting neighbor topology information regarding one or more neighbors associated with the second base station and third base station, respectively; receiving, from the second base station, a first neighbor topology response message comprising the neighbor topology information regarding one or more neighbors associated with the second base station, and receiving, from the third base station, a second neighbor topology response message comprising the neighbor topology information regarding one or more neighbors associated with the third base station; determining, from the first and second neighbor topology response messages that the first base station has same first degree neighbors as the second base station, but more first degree neighbors than the third base station; and reducing power of either the first base station or the second base station based on the determination and at least one of the following: total SINR received by each base station, distance-wise closeness of the first base station's first degree neighbors, and distance-wise closeness of the second base station's first degree neighbors. Optionally, the method in this embodiment further comprises sending a proposed resource adjustment message to the second and third base stations indicating the power reduction.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but to be accorded the widest scope consistent with the principles and novel features disclosed herein.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

CONCLUSION

A system and method has been shown in the above embodiments for an interface between base stations for topology discovery to enable coordinated resource usage. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method for wireless communications as implemented in a first base station comprising:
    transmitting a neighbor topology request message to a second base station, said neighbor topology request message soliciting neighbor topology information regarding one or more neighbors associated with said second base station;
    receiving, from the second base station, a neighbor topology response message comprising said neighbor topology information regarding one or more neighbors associated with said second base station;
    partitioning one or more network resources according to said received neighbor topology response message between said first and second base stations,
    wherein said neighbor topology information regarding one or more neighbors associated with said second base station further comprises one or more parameters associated with a degree of connectivity of said neighbors associated with said second base station, and said degree of connectivity of said neighbors associated with said second base station is either a first-degree of connectivity of said neighbors associated with said second base station or a second-degree of connectivity of said neighbors associated with said second base station, and
    wherein, after receiving said neighbor topology response message, said method further comprises transmitting, to said second base station, a proposed resource adjustment message between said first base station and said second base station.

2. The method of claim 1, wherein said method further comprises:
   receiving a reciprocal neighbor topology request message from said second base station, said reciprocal neighbor topology request message soliciting neighbor topology information regarding one or more neighbors associated with said first base station; and
   transmitting, to said second base station, another neighbor topology response message comprising said solicited neighbor topology information regarding one or more neighbors associated with said first base station.

3. The method of claim 1, wherein said neighbor topology further comprises, for each neighbor base station of said second base station, any of, or a combination of, the following: received Signal to Interference and Noise Radio (SINR), Signal to Interference Ratio (SIR), an indication of physical distance of each neighbor base station to said second base station.

4. The method of claim 1, wherein said neighbor topology further comprises SINR thresholds used by second base station and previous Self Organizing Networks (SON) sniffing time.

5. The method of claim 1, wherein said neighbor topology request message and said neighbor topology response message are received via an X2 or S1 interface.

6. The method of claim 1, wherein said neighbor topology request message and said neighbor topology response message are received via an over-the-air interface.

7. The method of claim 1, where the method further comprises embedding neighbor topology responses/requests in standard messages of X2 setup or evolved Node B (eNB) configuration update procedure.

8. The method of claim 1, wherein said method further comprising:
   receiving, from said second base station, a notification that said proposed resource adjustment message was accepted by said second base station, and
   adjusting network resource utilization based on said acceptance.

9. The method of claim 1, wherein said proposed resource adjustment message comprises time-slot sharing information between said first base station and second base station.

10. The method of claim 1, wherein said proposed resource adjustment message comprises frequency and time-slot sharing information between said first base station and second base station.

11. The method of claim 1, wherein said method further comprising:
   receiving, from said second base station, a notification of rejection of said proposed resource adjustment message; and
   receiving, from said second base station, an alternative resource adjustment message.

12. The method of claim 1, wherein said proposed resource adjustment message comprises frequency sub-band sharing information between said first base station and second base station.

13. The method of claim 1, wherein said proposed resource adjustment message comprises proposed power level adjustment by first base station and/or second base station.

14. The method of claim 1, wherein said method further comprising:
   determining, based on said received neighbor topology response message, if said second base station is topologically close to cause interference;
   identifying frequency sub-bands in use for said second base station;
   selecting from an available set of frequency sub-bands, a subset of sub-bands orthogonal to said identified frequency sub-bands in use; and
   sending a proposed resource adjustment message to said second base station proposing said selected subset of orthogonal sub-bands.

15. The method of claim 14, wherein said method further comprises receiving, when said proposed resource adjustment message is not accepted by said second base station, an alternative proposed resource adjustment message, and accepting or rejecting said alternative proposed resource adjustment message by sending a notification message.

16. A method for wireless communications as implemented in a first base station comprising:
   transmitting a first neighbor topology request message to a second base station and a second neighbor topology request message to a third base station, said first and second neighbor topology request messages soliciting neighbor topology information regarding one or more neighbors associated with said second base station and third base station, respectively;
   receiving, from the second base station, a first neighbor topology response message comprising said neighbor topology information regarding one or more neighbors associated with said second base station, and receiving, from the third base station, a second neighbor topology response message comprising said neighbor topology information regarding one or more neighbors associated with said third base station;
   determining, from said first and second neighbor topology response messages that said first base station has more first degree neighbors than both said second and third base stations; and
   reducing power of said first base station based on said determination.

17. The method of claim 16, wherein said method further comprises sending a proposed resource adjustment message to said second and third base stations indicating said power reduction.

18. A method for wireless communications as implemented in a first base station comprising:
   transmitting a first neighbor topology request message to a second base station and a second neighbor topology request message to a third base station, said first and second neighbor topology request messages soliciting neighbor topology information regarding one or more neighbors associated with said second base station and third base station, respectively;
   receiving, from the second base station, a first neighbor topology response message comprising said neighbor topology information regarding one or more neighbors associated with said second base station, and receiving, from the third base station, a second neighbor topology response message comprising said neighbor topology information regarding one or more neighbors associated with said third base station;
   determining, from said first and second neighbor topology response messages that said first base station has same first degree neighbors as said second base station, but more first degree neighbors as said third base station; and
   reducing power of either said first base station or said second base station based on said determination and at least one of the following: total SINR received by each base station, distance-wise closeness of said first base station's first degree neighbors, and distance-wise closeness of said second base station's first degree neighbors.

19. The method of claim 18, wherein said method further comprises sending a proposed resource adjustment message to said second and third base stations indicating said power reduction.

* * * * *